US008108734B2

(12) United States Patent
Andrews et al.

(10) Patent No.: US 8,108,734 B2
(45) Date of Patent: Jan. 31, 2012

(54) INTELLIGENT ROLLING UPGRADE FOR DATA STORAGE SYSTEMS

(75) Inventors: Benjamin L. Andrews, Tucson, AZ (US); Anthony J. Ciaravella, Tucson, AZ (US); Joseph W. Dain, Tucson, AZ (US); Nikhil Khandelwal, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 176 days.

(21) Appl. No.: 12/610,517

(22) Filed: Nov. 2, 2009

(65) Prior Publication Data

US 2011/0107135 A1 May 5, 2011

(51) Int. Cl.
*G06F 11/00* (2006.01)
(52) U.S. Cl. ....... 714/47.1; 714/4.1; 714/38.1; 717/168; 717/171
(58) Field of Classification Search .......... 714/4.1, 714/4.3, 4.4, 38.1, 42, 47.1, 47.2, 47.3; 717/168, 717/171
See application file for complete search history.

(56) References Cited

U.S. PATENT DOCUMENTS

| 5,781,908 | A | 7/1998 | Williams et al. |
| 6,681,389 | B1 * | 1/2004 | Engel et al. .................. 717/173 |
| 6,854,069 | B2 | 2/2005 | Kampe et al. |
| 6,986,133 | B2 | 1/2006 | O'Brien et al. |
| 7,260,818 | B1 | 8/2007 | Iterum et al. |
| 2003/0040975 | A1 | 2/2003 | Baron |
| 2004/0199812 | A1 * | 10/2004 | Earl et al. ....................... 714/13 |
| 2004/0216133 | A1 * | 10/2004 | Roush ........................... 719/316 |
| 2005/0034122 | A1 * | 2/2005 | Kung et al. ................... 717/177 |
| 2005/0210461 | A1 | 9/2005 | Srivastava et al. |
| 2005/0234931 | A1 | 10/2005 | Yip et al. |
| 2005/0267951 | A1 * | 12/2005 | Joshi et al. ................... 709/220 |
| 2006/0130042 | A1 | 6/2006 | Dias et al. |
| 2006/0168574 | A1 | 7/2006 | Giannini et al. |
| 2006/0294413 | A1 * | 12/2006 | Filz et al. ......................... 714/4 |
| 2008/0072230 | A1 | 3/2008 | Jackson |
| 2008/0195693 | A1 | 8/2008 | Gao et al. |
| 2009/0030986 | A1 | 1/2009 | Bates |
| 2009/0119655 | A1 | 5/2009 | Quilty |
| 2010/0042869 | A1 * | 2/2010 | Szabo et al. .................... 714/4 |

OTHER PUBLICATIONS

Ellard T. Roush, "Cluster Rolling Upgrade using Multiple Version Support," IEEE, 2002, 8 pages.
Partial International Search Report for Counterpart International Application No. PCT/EP20101066127, dated Mar. 31, 2011.
"Procedure for Dynamic Application Code Upgrade for a WebSphere Application in a Clustered Unix Environment," IBM, www.ip.com, Jul. 2007, 4 pages.
"Scalable-Peer Node Manager," IBM, www.ip.com, Apr. 2007, 2 pages.

* cited by examiner

*Primary Examiner* — Robert Beausoliel, Jr.
*Assistant Examiner* — Joseph D Manoskey
(74) *Attorney, Agent, or Firm* — Griffiths & Seaton PLLC

(57) ABSTRACT

Various method, system, and computer program product embodiments for facilitating upgrades in a computing storage environment are provided. In one such embodiment, one of an available plurality of rolling upgrade policies registering at least one selectable upgrade parameter for an upgrade window is selected. A node down tolerance factor is set for at least one node in the computing storage environment. The node down tolerance factor specifies a percentage of elements of the at least one node taken offline to apply the selected one of the available plurality of rolling upgrade policies during the upgrade window.

18 Claims, 5 Drawing Sheets

INTELLIGENT ROLLING UPGRADE FOR DATA STORAGE SYSTEMS

BACKGROUND OF THE INVENTION

1. Field of the Invention

The present invention relates in general to computers, and more particularly to apparatus, method and computer program product embodiments for implementing upgrade mechanisms in a computing storage environment.

2. Description of the Related Art

Computers and computer systems are found in a variety of settings in today's society. Computing environments and networks may be found at home, at work, at school, in government, and in other settings. Computing environments increasingly store data in one or more storage environments apart from the local interface presented to a user. In many cases, the storage environments are located across wide area networks (WANs), in which data is sent to/received from a storage system located remotely from the host.

In some situations, data storage is provided locally and also provided to a remote storage environment to enhance data security by providing redundancy. In these situations, several instances of data may be stored in multiple locations to provide for failsafe recovery. Storage environments such as network attached storage (NAS) and storage area networks (SAN) allow for these implementations, and for the implementation and maintenance of a larger amount of storage. SAN, NAS and similar systems are increasingly used for supplying a variety of services, such as email, database, applications, and other services.

SUMMARY OF THE INVENTION

Data storage systems implemented in such forms as NAS, SAN, and other topologies, periodically require upgrades in order to maintain security, compatibility, redundancy, and other characteristics. Innovation in upgrade mechanisms for such systems is beneficial to reduce cost, improve bandwidth and resource consumption, increase security, and the like. As a result, generally there is a continual need to innovate in such upgrade mechanisms in order to provide increased system performance and the other characteristics previously described.

In view of the foregoing, various method, system, and computer program product embodiments for facilitating upgrades in a computing storage environment are provided. In one such embodiment, by way of example only, one of an available plurality of rolling upgrade policies registering at least one selectable upgrade parameter for an upgrade window is selected. A node tolerance factor is set for at least one node in the computing storage environment. The node down tolerance factor specifies a percentage of elements of the at least one node taken offline to apply the selected one of the available plurality of rolling upgrade policies during the upgrade window.

In addition to the foregoing exemplary embodiment, various other method, system, and computer program product embodiments are provided and supply related advantages.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF THE DRAWINGS

The illustrated embodiments below provide mechanisms for facilitating upgrades in a computing storage environment, such as a scaled out network attached storage topology. In one exemplary embodiment, these mechanisms pertain to providing intelligent, automated, and reliable upgrades (such as code upgrades) on so-called "clusters" of the computing storage environment. One such storage environment may include a number of varying "nodes." For example, one environment may have up to 32 interface nodes for communication between clients and the storage environment, storage nodes for performing storage activity, such as read and write activity, and a management node for managing the various portions of the storage environment. Each node in the environment may comprise a server executing a particular operating system (OS) such as Linux® and application software to provide various data storage services. Such an environment is further illustrated in FIG. 1, following.

Figure 1:
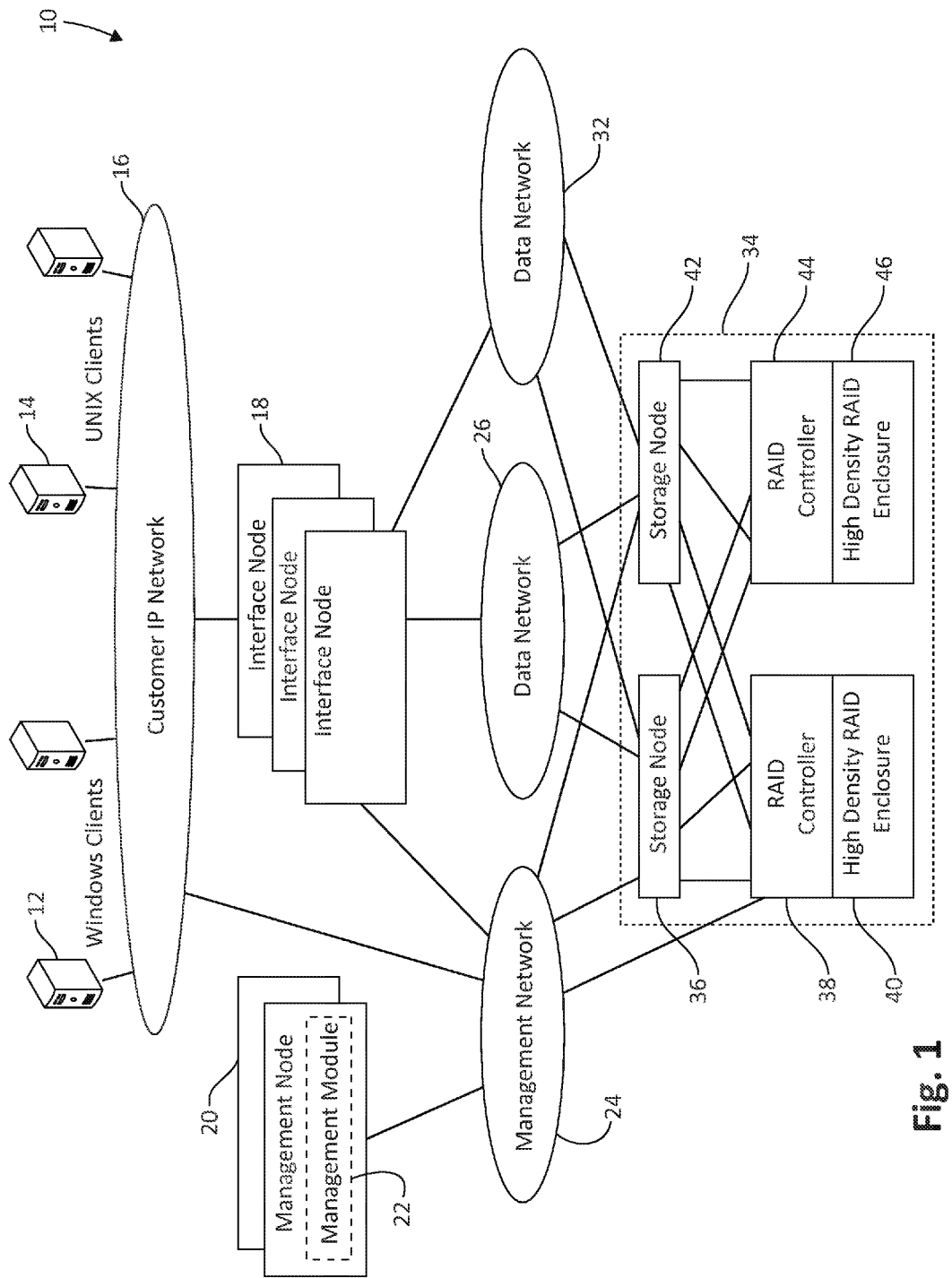
FIG. 1 is a block diagram illustrating a portion of an exemplary computing storage environment.

FIG. 1 illustrates a portion of an exemplary computing storage environment 10 in which aspects of the present invention and claimed subject matter may be implemented. Environment 10 as depicted is structured as a two-tier system, the first tier including interface nodes 18 that present network file system (NFS), hypertext transfer protocol (HTTP), common internet file system (CIFS), and similar images to a user/customer IP network 16. The second tier includes storage nodes 36 and 42 that are attached to high-density storage arrays in a storage building block 34. For high availability, the two storage nodes 36 and 42 are connected in pairs to storage arrays comprising the storage building block 34. The first tier interface nodes 18 are connected to the second tier storage nodes 36 and 42 with a management network 24, such as a gigabit Ethernet network, for management and also by an additional network 26 for data path.

The storage building block(s) such as block 34 may be adapted to present general parallel file system (GPFS) network shared devices (NSDs), and the interface nodes 18 access these NSDs. In addition, to provide user facing data protocols such as NFS, each interface node 18 is part of the GPFS cluster and also runs CTDB (cluster TDB database) protocol. Optionally, an additional network 24 or an extension of data network 26 may connect a Tivoli® storage manager (TSM) cluster including one or more TSM nodes to the storage building block 34. Block 34 as shown includes two RAID controllers 38 and 44, such as high-density RAID controllers, each connected to a high-density disk enclosure or similar storage enclosure 40 and 46. Enclosures 40 and 46 as well as controllers 38 and 44 are in turn connected to the storage nodes 36 and 42, respectively. A management cluster includes one or more management nodes 20, each including a management module 22, the functionality thereof to be further described, below. Finally, a variety of user clients 12 and 14, such as client devices and machines operational on a Windows® or UNIX® platform, respectively, are connected via the network 16 to the network 24 and/or interface nodes 18 as shown.

Figure 2:
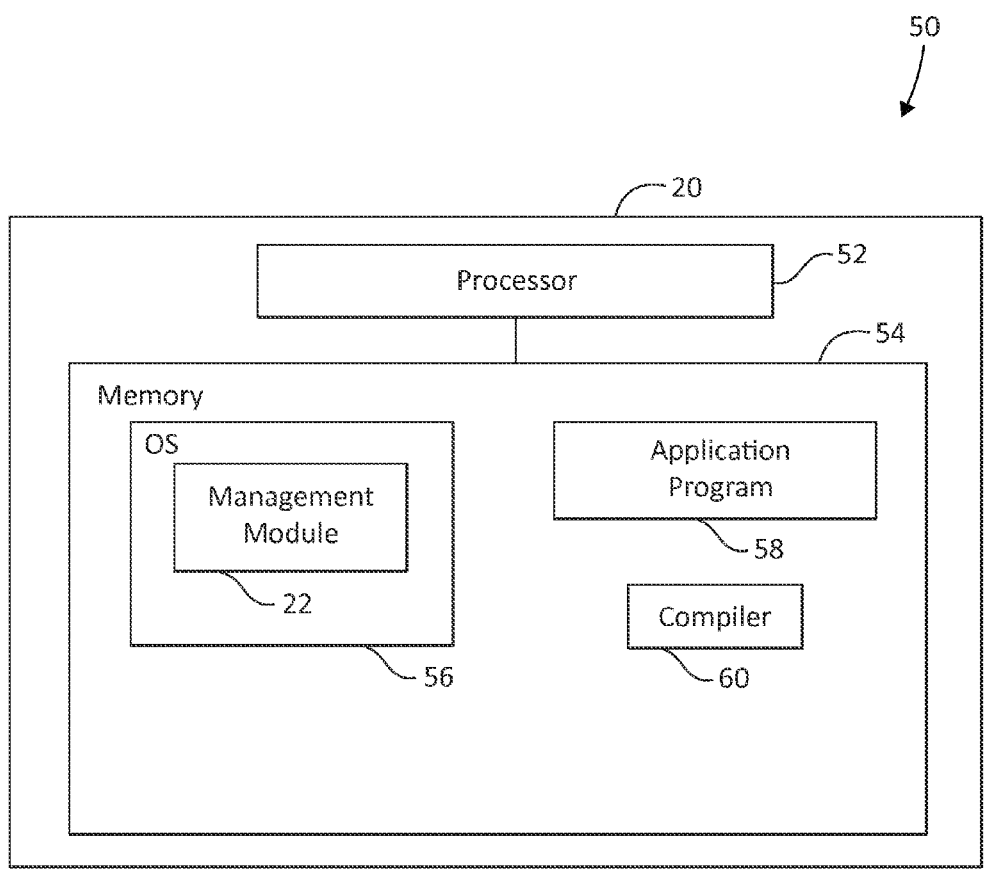
FIG. 2 is a block diagram illustrating an exemplary portion of a management node of the exemplary computing storage environment depicted in FIG. 1.

Turning now to FIG. 2, an exemplary portion 50 of a management node 20 as also seen in FIG. 1, previously, is illustrated. Portion 50 of management node 20 is operable in a computer environment as a portion thereof, in which mechanisms of the following illustrated embodiments may be implemented. It should be appreciated, however, that FIG. 2 is only exemplary and is not intended to state or imply any limitation as to the particular architectures in which the exemplary aspects of the various embodiments may be implemented. Many modifications to the architecture depicted in FIG. 2 may be made without departing from the scope and spirit of the following description and claimed subject matter.

In the illustrated embodiment, management node 20 includes a processor 52 and a memory 54, such as random access memory (RAM). The management node 20 may be operatively coupled to several components not illustrated for purposes of convenience, including a display, which presents images such as windows to the user on a graphical user interface, a keyboard, mouse, printer, and the like. Of course, those skilled in the art will recognize that any combination of the above components, or any number of different components, peripherals, and other devices, may be used with the management node 20.

In the illustrated embodiment, the management node 20 operates under control of an operating system (OS) 56 (e.g. z/OS, OS/2, LINUX, UNIX, WINDOWS, MAC OS) stored in the memory 54, and interfaces with the user to accept inputs and commands and to present results. In one embodiment of the present invention, the OS 56 facilitates upgrade mechanisms according to the present invention. To this end, OS 56 includes a management module 22 as previously described, which may be adapted for carrying out various processes and mechanisms in the exemplary methods described following.

The management node 20 may implement a compiler 60 that allows an application program 58 written in a programming language such as COBOL, PL/1, C, C++, JAVA, ADA, BASIC, VISUAL BASIC or any other programming language to be translated into code that is readable by the processor 52. After completion, the computer program 58 accesses and manipulates data stored in the memory 54 of the management node 20 using the relationships and logic that was generated using the compiler 60.

To further implement and execute mechanisms and processes according to the present invention, OS 56, in conjunction with management module 22, memory 54, processor 52, program 58, and other computer processing, networking, and storage components, may implement upgrade mechanisms as will be further described. As one of ordinary skill in the art will appreciate, the mechanisms implemented by management module 22 as presently illustrated may be implemented in various forms and architectures. Accordingly, the illustration of management module 22 in the present figure is again intended to demonstrate logical relationships between possible computing components in the management node 20, and not to imply a specific physical structure or relationship.

In one embodiment, instructions implementing the operating system 56, the computer program 58, and the compiler 60, as well as the management module 22 are tangibly embodied in a computer-readable medium, which may include one or more fixed or removable data storage devices, such as a zip drive, disk, hard drive, DVD/CD-ROM, digital tape, solid state drives (SSDs), etc. Further, the operating system 56 and the computer program 58 comprise instructions which, when read and executed by the computing storage environment to perform the steps necessary to implement and/or use the present invention. Computer program 58 and/or operating system 56 instructions may also be tangibly embodied in the memory 54 and/or transmitted through or accessed by networks 16, 24, 26, and 32 (FIG. 1) via various components. As such, the terms "article of manufacture," "program storage device" and "computer program product" as may be used herein are intended to encompass a computer program accessible and/or operable from any computer readable device or media.

Embodiments of the present invention may include one or more associated software application programs 58 that include, for example, functions for managing a distributed computer system comprising a network of computing devices, such as a SAN or NAS as previously described. Accordingly, processor 52 may comprise one or more storage management processors (SMP). The program 58 may operate within a single computer and/or management node 20 or as part of a distributed computer system comprising a network of computing devices. The network may encompass one or more computers connected via a local area network and/or Internet connection (which may be public or secure, e.g. through a virtual private network (VPN) connection), or via a fibre channel SAN or other known network types as will be understood by those skilled in the art. (Note that a fibre channel SAN is typically used only for computers to communicate with storage systems, and not with each other.)

Referring again to FIG. 1, in computing storage environments such as environment 10, it may be desirable that several conditions be satisfied. For example, one storage node 36 or 42 should be available at all times. In addition, a GPFS quorum should not be broken, and a given CTDB should have additional interface nodes 18 to failover IP addresses exported by the CTDB. In view of the foregoing example conditions, the environment 10 may need to be upgraded, such as the addition of new computer readable program code. The conditions above may present constraints to maintain during such an upgrade.

The present invention and claimed subject matter provide exemplary mechanisms for performing upgrades in such conditions, and in view of such example constraints, so as to avoid enterprise unworthy solutions such as taking the environment offline. These mechanisms offer efficient, intelligent, flexible and automated solutions. Alternative solutions are undesirable as they may require manual effort to perform the upgrade (such as manual load on a number of nodes). Additionally, such solutions do not prevent against potentially propagating bad code across all nodes in a particular cluster.

In one embodiment, the mechanisms of the present invention provide a flexible and reliable automated "rolling code upgrade" process that provides the following unique features and benefits for the user. First, the process provides built in health checking intelligence to ensure critical resources are not removed as part of an automated code upgrade such that the cluster becomes inoperable. Second, the process detects potential bad code propagation and prevents bad code from being propagated to all nodes in a storage cluster. Third, the process intelligently and dynamically gains confidence throughout the automated rolling code upgrade process. As more nodes are successfully loaded with the latest code, the method will run more parallel code upgrade instances.

Continuing on, in a fourth benefit, the process dynamically relearns the time to complete a code upgrade and applies this time to future code upgrade time to completion estimations as will be further described. Fifth, the process provides an automated method for performing rolling code upgrades on a large system with multiple nodes and offers flexibility to satisfy varying user needs. Sixth, the process allows users to register a rolling upgrade policy that defines when a rolling code upgrade will take place and how long the upgrade window will be. Seventy, the process allows users to control the percentage of interface and storage nodes that may be down at any given time. Eighth, the process allows users to block individual nodes from a rolling code upgrade. Ninth, the process provides checkpoint error recovery for unexpected code upgrade failures.

Upgrades, such as code upgrades, may be managed from a centralized management node (e.g., management node 20 and management module 22, FIGS. 1, 2). In one exemplary embodiment, the management node contains the code images that are to be propagated to the target nodes as part of upgrades. In one exemplary code upgrade implementation, code is propagated to target nodes using a Red Hat® YUM (yellowdog updater modified) repository, but it should be noted that other methods of code propagation should not be excluded, such as using a stateless mechanism incorporating a preboot execution environment (PXE) boot to propagate code to the target nodes in the system.

Returning to the YUM embodiment, the HTTP protocol may be used to transfer code to target nodes as part of YUM upgrades and the secure shell (SSH) protocol may be used to initiate YUM upgrades on target nodes from the management node. In other words, in this embodiment, code upgrades to all nodes are driven from the management node. Users are able to specify a rolling code upgrade policy that registers when a rolling code upgrade will start and for how long it will run. This is helpful for allowing users to automatically perform code upgrades during off peak hours. For example, users may set up a rolling code upgrade policy that runs every Saturday and Sunday from midnight until 8 am. These time constraints are incorporated into the mechanisms described further below.

Additionally, users may set different node down tolerance factors for interface nodes and storage nodes. For example, a user may set their interface node down tolerance to 33%. This ensures that up to 33% of interface nodes may be down at a time. Nodes may be down due to reasons other than code upgrades and these other reasons are factored into the equation and the interface node down tolerance constraint is incorporated into the mechanisms described further below. Similarly, users may set a different tolerance for storage nodes down at a time. As an example, a user may set a storage node down tolerance factor of 50%, indicating that half of the storage nodes may be down at any given time. This calculation takes into account storage nodesthat are down due to other reasons besides code upgrades and the constraint is incorporated into the mechanisms described further below.

In addition to the foregoing, users may also choose to block specific nodes from code upgrades. Providing such flexibility is advantageous to ensure user needs may be met. For example, a user who registers a code upgrade process during off hours may be able to tolerate a larger amount of nodes down at a time due to the decreased load on the system while other users may need to keep more nodes up to ensure proper performance is maintained. These constraints are independent of the overall system health checking associated with code upgrades such as checking CTDB and GPFS states, for example.

Figure 3:
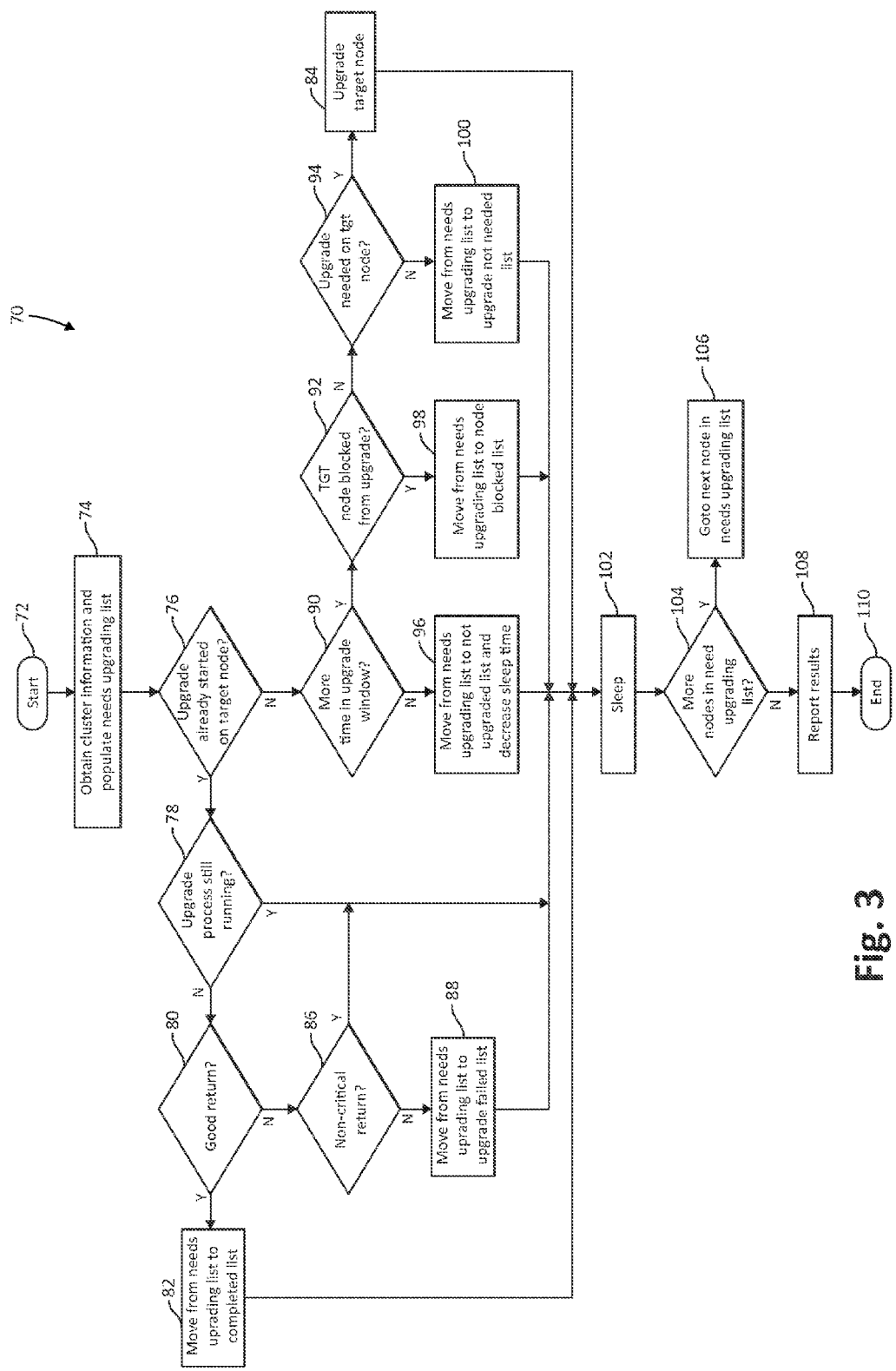
FIG. 3 is a flow chart diagram illustrating an exemplary wrapper function for performing such functionality as ensuring upgrades have occurred on all nodes in the computing storage environment.

Turning now to FIG. 3, a flow-chart diagram of an exemplary "wrapper function" method 70 is depicted. As one of ordinary skill in the art will appreciate, various steps in the method 70 may be implemented in differing ways to suit a particular application. In addition, the described method may be implemented by various means, such as hardware, software, firmware, or a combination thereof operational on or otherwise associated with the computing storage environment. For example, the method 70 may be implemented, partially or wholly, as a computer program product including a computer-readable storage medium having computer-readable program code portions stored therein. The computer-readable storage medium may include disk drives, flash memory, digital versatile disks (DVDs), compact disks (CDs), and other types of storage mediums.

In one embodiment, method 70 is responsible for ensuring code upgrades take place on all nodes in the computing storage environment. As will be further described, the method 70 relies on the functionality in step 84 (upgrade target node) to perform health checking and intelligence tasks as will be further described. Upon starting (step 72), method 70 first obtains the host names and/or IP addresses of nodes in the cluster, placing this information in a list of nodes that need upgrading (step 74). In one embodiment this is accomplished with a query to the GPFS file system. Other methods may be used to obtain the list of nodes in the cluster including referencing the /etc/hosts file, making queries to a configuration database or flat configuration file, etc.

After populating the list of nodes that need upgrading, the method 70 checks to see if an upgrade has started on the target node (step 76). If an upgrade has not been started on the target node the method 70 proceeds to check to see if there is more time available in the rolling upgrade window (step 90). If there is more time available in the upgrade window the method 70 checks to see if the target node is blocked from an upgrade (step 92). If the target node is not blocked from an upgrade the node determines if an upgrade is needed on the target node (step 94). This is accomplished in one embodiment by issuing an SSH command from the management node to the target node that performs a YUM query. As a result of the YUM query, the packages that need to be updated on the target node are returned.

If an upgrade is needed on the target node the method 70 calls the upgrade target node function (step 84) and proceeds to sleep (step 102). After waking up from the sleep, the method 70 determines if additional nodes are found in the needs upgrading list (step 104). If additional nodes are found in the needs upgrading list, the method 70 references the next node in the list (step 106) and proceeds to the check to determine if an upgrade is already on progress on the target node (returning to step 76).

If an upgrade has already started on the target node (again, step 76), the method 70 proceeds to step 78, which checks to see if the upgrade is still in process for the target node. In the depicted embodiment, instances of the "upgrade target node" (again, step 84) are started in the background, and it is beneficial to monitor their completion from this parent rolling code upgrade process.

If an upgrade is still in process for the target node (again, step 78), the method 70 proceeds to sleep (again, step 102). Alternatively, if the upgrade has finished on the target node, the method 70 proceeds to check the return of the upgrade process. If the upgrade process is successful (step 80), the method 70 moves the target node from the node needs upgrading array to the upgrade completed list (step 82) and proceeds to step 102 to sleep. Alternatively, if the return code is not successful, the method 70 checks to see if the code upgraded failed due to a non-critical error (step 86). If the upgrade failed due to a non-critical error, the method 70 leaves the target node in the node needs upgrading list and proceeds to the sleep step (again, step 102). The "upgrade target node" function may encounter a non-critical failure on the target node due to many reasons such as performing an upgrade on the target node would break the GPFS cluster and render the cluster inoperable. Such an example is not a critical error, and the method 70 simply reattempts again at a later time to upgrade the specific target node (step 88, returning to step 102). If the upgrade did fail for a critical error (again, step 86), the method 70 moves the target node from the needs upgrading list to the failed list (step 88) and proceeds to the sleep step 102.

Referring back to the determination if additional time is available in the upgrade window (again, step 90), if no more time is available, method 70 moves the target node from the needs upgrading list to the not upgraded list and decreases the sleep time to allow for faster cleanup of code upgrade tasks that are already in progress (step 96) and proceeds to the sleep step. Referring back to the target node blocked from upgrade check (again, step 92), if the target node is blocked from a code upgrade, method 70 moves the target node from the needs upgrading list to the blocked list (step 98) and proceeds to the sleep step 102. Referring back to the upgrade needed on target node check (step 94), if an upgrade is not needed on the target node, method 70 moves the target node from the needs upgrading list to the upgrade not needed list (step 100) and proceeds to the sleep step 102. Referring back to the check to determine if there are more nodes in the needs upgrading list (step 102), if no additional nodes remain in the needs upgrading list (again, step 104), method 70 reports the outcome of the rolling code upgrade (step 108) by displaying the contents of the following lists: Nodes not upgraded, Nodes blocked from upgrade, Nodes upgraded, and Node upgrade failed.

Figure 4:
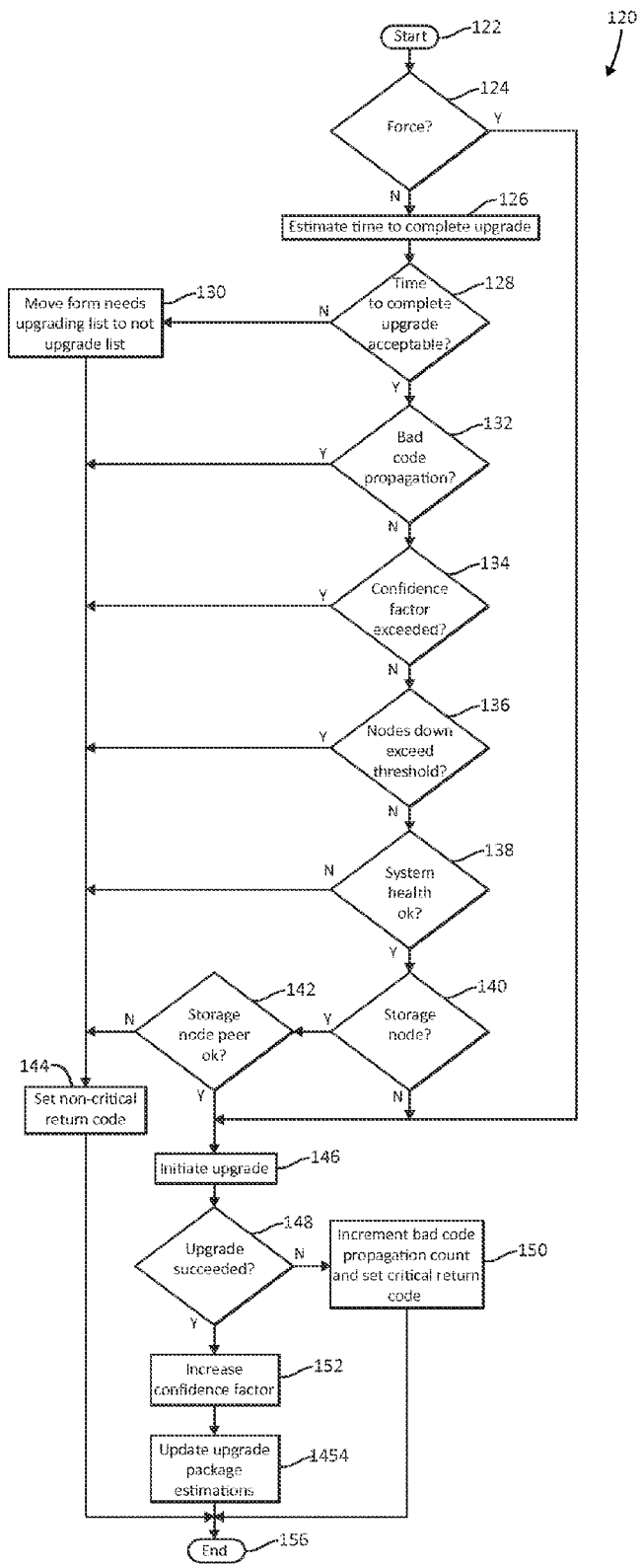
FIG. 4 is a flow chart diagram illustrating an exemplary upgrade mechanism invoked by the wrapper function depicted in FIG. 3.

Turning now to FIG. 4, a flow-chart diagram of a method 120 depicting an exemplary upgrade target node function for a code upgrade mechanism, invoked by step 84 of FIG. 3 previously, is shown. The upgrade target node function incorporates health checks and other intelligence features to ensure reliable and unobtrusive rolling code upgrades. Upon starting the code upgrade function (step 122) the method 120 checks to see if the force flag is set (step 124). If the force flag is set the method 120 bypasses all health checks and immediately starts the code upgrade.

If the force flag is not set (again, step 124) the method 120 estimates the time to complete a code upgrade according to the type of packages that need to be upgraded (step 126). In one embodiment, this is accomplished by determining the number of packages to upgrade in addition to the type of packages that need to be upgraded. Since there may be multiple interface and storage nodes in the same cluster, it is probable that other target nodes have already upgraded the same packages. As a result, the method 120 can reference the time that it actually took to complete the upgrade of the same packages to provide a highly accurate estimation of the time that it will take to complete an upgrade on the target node. Such built in intelligence provides additional efficiency for the code upgrade process. For example, without having the intelligence to use information associated with previous upgrades of the same code packages, the method 120 may overestimate the time needed to perform the upgrade, resulting in not upgrading all nodes in the system when a more accurate calculation would indicate that an upgrade could have been contained in the existing upgrade window.

As a next step, the method 120 confirms if the time to complete the upgrade is acceptable by ensuring that the estimated code upgrade time is within the remaining time left to complete a code upgrade for this specific code upgrade window (step 128). If the code upgrade time is acceptable, the method 120 proceeds to the bad code propagation check (step 132). In one embodiment, this is accomplished by examining the current number of nodes that have failed a code upgrade at the specific code level that the method 120 is trying to upgrade to, and comparing this value to a bad code propagation tolerance value. In one embodiment, this threshold value is set to 1 for default but may be changed dynamically by service personnel as needed.

If no bad code propagation is detected, the method 120 proceeds to check if a parallel upgrade confidence factor has been exceeded (step 134). In certain cases users may have set their interface node down tolerance and storage node down tolerance to values that exceed the bad code propagation threshold. For example, if a user indicates that two interface nodes can be down at a time, without the parallel upgrade confidence factor, two code upgrades would start in parallel. If these two nodes are the first nodes that are receiving the new code level and the new code level is bad, the method 120 would render two nodes in the system inoperable and violate the bad code propagation threshold. To provide proper protection against such cases but still provide maximum efficiency, a check against the parallel upgrade confidence factor is performed. In one embodiment, by default the confidence factor is set to 1. In the example described, checking the confidence factor results in only taking one node down due to bad code propagation as opposed to two nodes. As more nodes successfully complete code upgrades at the specified code level, the confidence factor is increased, allowing for upgrades to be performed on more nodes in parallel.

If the parallel upgrade confidence factor has not been exceeded, the method 120 proceeds to the node down threshold check (step 136). If the number of interface or storage nodes down including the node that we want to upgrade does not violate the current nodes down threshold, the method 120 proceeds to check the cluster health (step 138). When checking the system health, the GPFS cluster quorum may be checked to ensure that taking the specified target node down does not break the GPFS quorum. In addition, if the target node is an interface node the method 120 ensures that at least one other interface node is available to fail over all IP addresses exported by the target interface node that will have code upgraded.

If the system health checks succeed, the method 120 checks to see if the target node is a storage node (step 140). If the target node is a storage node, the method 120 checks the storage node peer GPFS state (step 142). If the storage node GPFS peer state is ok or normal, the method 120 proceeds to upgrade the target node (step 146). Alternatively, if the target node is not a storage node, the upgrade of the target node begins as all checks have successfully passed.

After upgrading the target node, the method 120 checks to see if the upgrade succeeded on the target node (step 148). If the upgrade succeeded on the target node, the confidence factor is increased (step 152). In the depicted embodiment, the current confidence factor is multiplied by two. Additionally the time associated with upgrading specific packages is updated as well according to the start time and end time of upgrading the associated packages.

After updating the package installation time estimations (step 154), the method 120 ends (step 156) and returns success to the calling application. On the other hand, if the upgrade does not complete successfully, the method 120 increments the bad code propagation count, sets a critical return code, and ends returning a critical error to the calling application (step 150).

Referring back to the code upgrade time check (again, step 128), if the estimated time to complete a code upgrade on the target node will exceed the time left in the upgrade window, the method 120 moves the target node from the needs upgrading list to the not upgraded list (step 130), and sets a non-critical return code (step 144), and ends (again, step 156). Referring back to the bad code propagation check (again, step 132), if the check determines that bad code may potentially be propagated across the system, the method 120 sets a non-critical return code and ends (again, steps 144, 156). Referring back to the parallel upgrade confidence factor check (again, step 134), if the number of nodes with upgrades already in process exceeds the parallel upgrade confidence factor, the method 120 sets a non-critical return code and ends (again, steps 144, 156). Referring back to the node down threshold check (again, step 136), if upgrading the target node would violate the node down threshold check for either storage nodes or interface nodes, the method 120 sets a non-critical return code and ends (again, steps 144, 156). Referring back to the system health check (again, step 138), if upgrading the target node would make the cluster unhealthy and take down resources from the user, the method 120 sets a non-critical return code and ends (again, steps 144, 156). Finally, referring back to the storage node peer health check (again, steps 140, 142), if the target storage node peer's is not healthy, the method 120 sets a non-critical return code and ends (again, steps 144, 156).

Throughout the upgrade process, persistent checkpoint timestamps may be stored such that if an upgrade has failed, a procedure may be invoked to recover from unexpected errors. Timestamps may also be collected to update the time to complete upgrades for specific packages. For example, timestamps may be obtained before and after initiating YUM code upgrades. Additionally, timestamps may be captured for the start and stop time for each package installation. These values are used to update upgrade package installation time estimations. After completing upgrades, it may be necessary to reboot the target node due to kernel updates, etc. In such cases, a timestamp may be taken prior to rebooting the target node, and another timestamp may be taken after the node comes back from reboot. These timestamps may be used to determine where the upgrade process failed and pickup from the failed checkpoint.

When new code is available for a particular storage cluster, it may be copied to the management node. As part of this process, the bad code propagation threshold may be set to 1, the storage node confidence factor may be set to 1, code upgrade time estimations may be set back to default, and all timestamps associated with checkpoint error recovery may be reset.

A code upgrade error recovery routine may provide checkpoint restart recovery in the event of an unexpected failure during a code upgrade. For example, the management node may loose power or reboot during the middle of a code upgrade to multiple nodes. In one embodiment, four timestamps may be used to indicate failures at specific checkpoints. The timestamps in terms of ordering of the upgrade process may include:

1. Upgrade start timestamp—indicating that an upgrade process has commenced on a target node
2. Upgrade complete timestamp—indicating that an upgrade process has completed on the target node
3. Reboot start timestamp—indicating that the target node is rebooting
4. Upgrade finish timestamp—indicating that the entire upgrade process has completed successfully These timestamps, in conjunction with tracking the name and type of packages that are being updated, may also be used to help ascertain in real time automatically the actual time to upgrade a node. For example, if a user has three packages to upgrade on a target node, after completing the upgrade a first time the user can use the knowledge of the packages coupled with the timestamps above to learn how long it will take to do this same or similar upgrade to another node.

Figure 5:
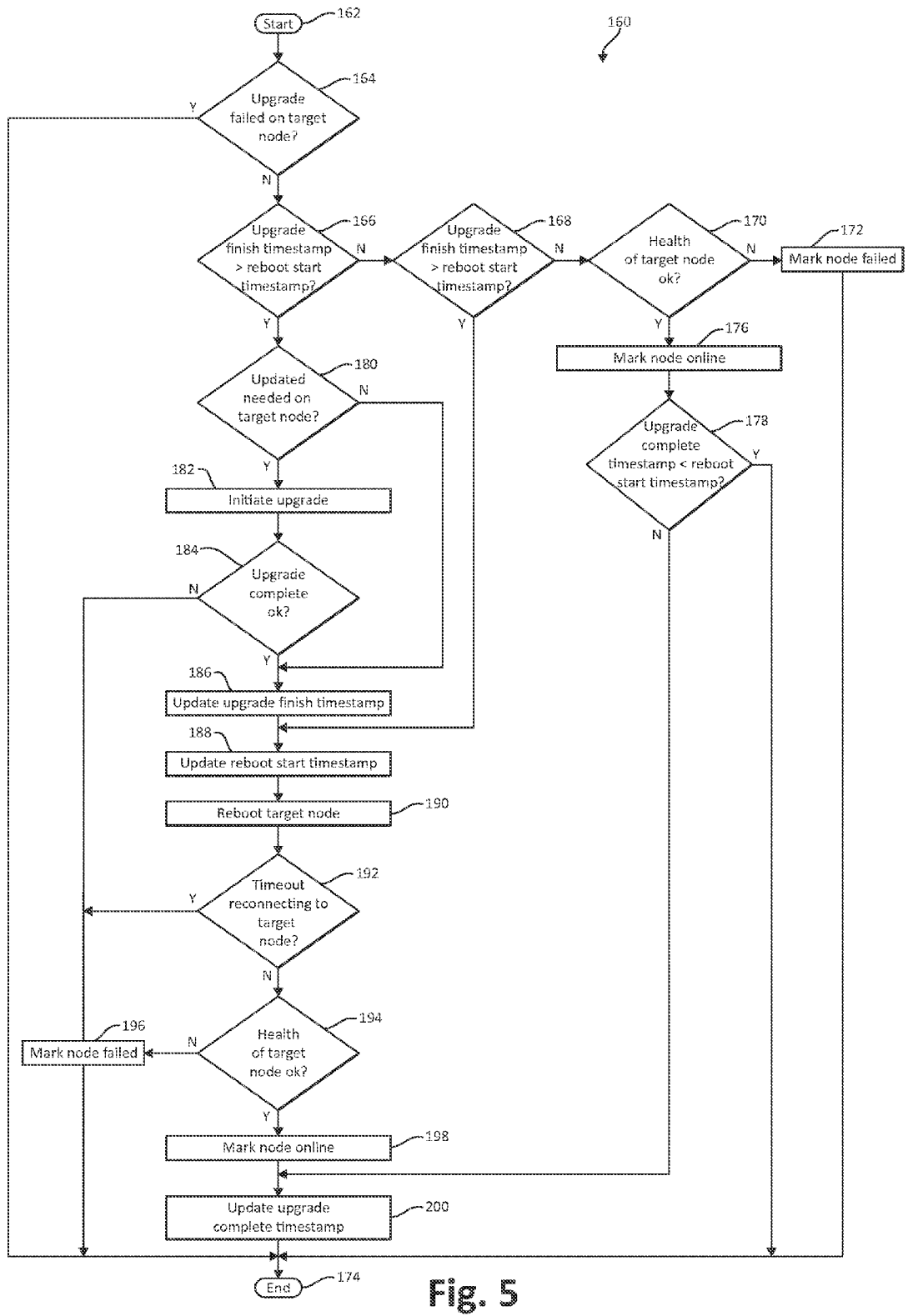
FIG. 5 is a flow chart diagram illustrating an exemplary error recovery mechanism.
Figure 3:
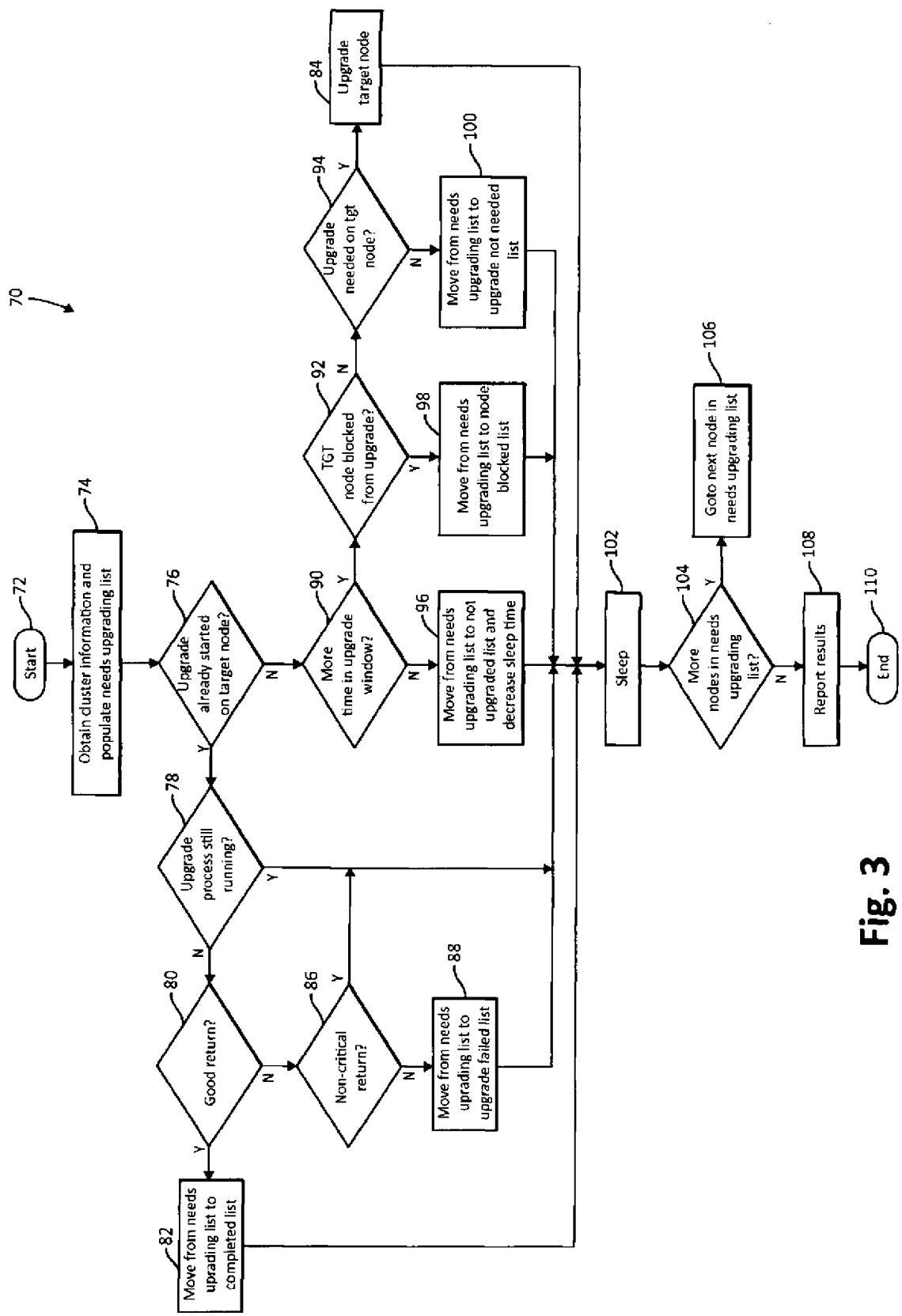

FIG. 5, following, is a flow-chart diagram of a method 160 illustrating an exemplary error recovery routine as introduced above. Upon starting (step 162), the error recovery routine the method 160 first checks to see if the previous upgrade encountered a hard failure on the target node (step 164). If a hard error was not encountered on the failed node, the method 160 proceeds to check if the upgrade start timestamp is greater than the upgrade finish timestamp (step 166). If the upgrade start time stamp is greater than the upgrade finish time stamp, an unexpected error has been encountered before the code upgrade method 160 was able to update the upgrade finish timestamp. As a result the method 160 proceeds to check if upgrades are still needed on the target node (step 180). If upgrades are still needed on the target node, the method 160 proceeds to upgrade the target node as required (step 182). After the upgrade of the target node completes, the method 160 proceeds to check the status of the upgrade process.

If the upgrade process completed successfully (step 184), the method 160 updates the upgrade finish timestamp (step 186), updates the reboot start timestamp (step 188), and proceeds to reboot the target node (step 190). If the method 160 does not time out waiting for the rebooted node to respond to a ping request (step 192), the method 160 checks the health status of the target node. If the health status of the target node is ok (step 194), the method 160 marks the target node online (step 198), updates the upgrade complete timestamp (step 200) and ends (step 174).

Referring back to the upgrade start time stamp greater than upgrade finish timestamp (again, step 166), if the upgrade start timestamp is not greater than the upgrade finish timestamp the method 160 proceeds to check if the upgrade finish timestamp is greater than the reboot start timestamp (step 168). If the upgrade finish timestamp is greater than the reboot start timestamp, the previous upgrade encountered an unexpected error before it was able to update the upgrade finish timestamp. As a result the method 160 updates the reboot start timestamp (again, step 188) and proceeds to reboot the target node (again, step 190). If the method 160 does not time out waiting for the rebooted node to respond to a ping request (again, step 192), the method 160 checks the health status of the target node. If the health status of the target node is ok (again, step 194), the method 160 marks the target node online (again, step 198), updates the upgrade complete timestamp (again, step 200) and ends (again, step 174).

Referring back to the check to determine if the upgrade finish timestamp is greater than the reboot start timestamp (again, step 168), if the upgrade finish timestamp is not greater than the reboot start timestamp, the method 160 proceeds to check the health of the target node. If the health of the target node is ok (step 170) the method 160 sets the target node to the online state (step 176) and proceeds to check if the upgrade complete timestamp is greater than the reboot start timestamp (step 178). If the upgrade complete timestamp is greater than the reboot start timestamp (again, step 178) the method 160 ends (again, step 174).

Referring back to the upgrade complete timestamp greater than the reboot start timestamp (again, step 178), if the upgrade complete timestamp is not greater than the reboot complete timestamp the method 160 updates the upgrade complete timestamp (again, step 200) and ends.

Referring back to the check to determine if additional upgrades are needed on the target node (again, step 180), if no additional upgrades are needed the method 160 proceeds to update the upgrade finish timestamp (again, step 186), and continues through steps 188-200 as shown. Referring back to the check to determine if the target node encountered a hard failure (step 196), if a hard failure occurred the method 160 ends (again, step 174). Referring back to the check to determine if the upgrade process completed successfully (again, step 184), if the upgrade process did not complete successfully the method 160 marks the target node as encountering a hard failure (again, step 174) and ends. Referring back to the health of target node checks (again, step 170), if the health of the target node is not ok the method 160 marks the target node as encountering a hard failure (step 172) and ends (again, step 174).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments of the present invention have been illustrated in detail, one of ordinary skill in the art will appreciate that modifications and adaptations to those embodiments may be made without departing from the scope of the present invention as set forth in the following claims.

What is claimed is:

1. A method for facilitating upgrades in a computing storage environment by a processor in communication with a memory device, comprising:
defining a parallel upgrade confidence factor corresponding to a proportion of node elements of the computing storage environment allowed to concurrently receive an upgrade procedure; and
performing the upgrade procedure on at least one of the node elements, wherein pursuant to successful completion of the upgrade procedure on the at least one of the node elements, the parallel upgrade confidence factor is increased to allow additional node elements of the computing storage environment to concurrently receive the upgrade procedure.

2. The method of claim 1, further including pursuant to performing the upgrade procedure on another one of the at least one of the node elements, determining if the parallel upgrade confidence factor has been exceeded.

3. The method of claim 2, wherein if the parallel upgrade confidence factor is determined to have been exceeded, limiting concurrent performance of the upgrade procedure on the node elements to be consistent with the parallel upgrade confidence factor.

4. A system for facilitating upgrades in a computing storage environment, comprising:
a processor in communication with a memory device, the processor operational on a management node in the computing storage environment, wherein the processor is adapted for:
defining a parallel upgrade confidence factor corresponding to a proportion of node elements of the computing storage environment allowed to concurrently receive an upgrade procedure, and
performing the upgrade procedure on at least one of the node elements, wherein pursuant to successful completion of the upgrade procedure on the at least one of the node elements, the parallel upgrade confidence factor is increased to allow additional node elements of the computing storage environment to concurrently receive the upgrade procedure.

5. The system of claim 4, wherein the processor is further adapted for, pursuant to performing the upgrade procedure on another one of the at least one of the node elements, determining if the parallel upgrade confidence factor has been exceeded.

6. The system of claim 5, wherein the processor is further adapted for, if the parallel upgrade confidence factor is determined to have been exceeded, limiting concurrent performance of the upgrade procedure on the node elements to be consistent with the parallel upgrade confidence factor.

7. A computer program product for facilitating upgrades in a computing storage environment by a processor in communication with a memory device, the computer program product comprising a non-transitory computer-readable storage medium having computer-readable program code portions stored therein, the computer-readable program code portions comprising:
a first executable portion for defining a parallel upgrade confidence factor corresponding to a proportion of node elements of the computing storage environment allowed to concurrently receive an upgrade procedure; and
a second executable portion for performing the upgrade procedure on at least one of the node elements, wherein pursuant to successful completion of the upgrade procedure on the at least one of the node elements, the parallel upgrade confidence factor is increased to allow additional node elements of the computing storage environment to concurrently receive the upgrade procedure.

8. The computer program product of claim 7, further including a third executable portion for, pursuant to performing the upgrade procedure on another one of the at least one of the node elements, determining if the parallel upgrade confidence factor has been exceeded.

9. The computer program product of claim 8, further including a fourth executable portion for, if the parallel upgrade confidence factor is determined to have been exceeded, limiting concurrent performance of the upgrade procedure on the node elements to be consistent with the parallel upgrade confidence factor.

10. A method for facilitating upgrades in a computing storage environment by a processor in communication with a memory device, comprising:
examining a current number of node elements of the computing storage environment having failed an upgrade procedure as an error propagation count, comparing the error propagation count against a predefined error propagation tolerance value; and
reporting if the predefined error propagation tolerance value is exceeded to provide a health status of the upgrade procedure, wherein if a subsequent performance of the upgrade procedure on an additional node element is unsuccessful, the error propagation count is incremented and a critical error is reported so as to avoid propagation of an upgrade error.

11. The method of claim 10, further including pursuant to the subsequent performance of the upgrade procedure, setting at least one persistent checkpoint timestamp to provide for error recovery.

12. The method of claim 10, further including, previous to the examining the current number of node elements:
estimating a time needed to perform the upgrade procedure as a function of time information obtained from previous performances of the upgrade procedure on additional node elements so as to provide greater accuracy to the estimation of time needed, and
comparing the estimation of the time needed with a predefined upgrade window, wherein if the estimation is within the predefined upgrade window, performing the subsequent upgrade procedure on the additional node element.

13. A system for facilitating upgrades in a computing storage environment, comprising:
a processor, in communication with a memory device, the processor operational on a management node in the computing storage environment, wherein the processor is adapted for:
examining a current number of node elements of the computing storage environment having failed an upgrade procedure as an error propagation count, comparing the error propagation count against a predefined error propagation tolerance value, and
reporting if the predefined error propagation tolerance value is exceeded to provide a health status of the upgrade procedure, wherein if a subsequent performance of the upgrade procedure on an additional node element is unsuccessful, the error propagation count is incremented and a critical error is reported so as to avoid propagation of an upgrade error.

14. The system of claim 13, wherein the processor is further adapted for, pursuant to the subsequent performance of the upgrade procedure, setting at least one persistent checkpoint timestamp to provide for error recovery.

15. The system of claim 13, wherein the processor is further adapted for estimating a time needed to perform the upgrade procedure as a function of time information obtained from previous performances of the upgrade procedure on additional node elements so as to provide greater accuracy to the estimation of time needed, and comparing the estimation of the time needed with a predefined upgrade window, wherein if the estimation is within the predefined upgrade window, the subsequent upgrade procedure is performed on the additional node element.

16. A computer program product for facilitating upgrades in a computing storage environment by a processor in communication with a memory device, the computer program product comprising a non-transitory computer-readable storage medium having computer-readable program code portions stored therein, the computer-readable program code portions comprising:
 a first executable portion for examining a current number of node elements of the computing storage environment having failed an upgrade procedure as an error propagation count, comparing the error propagation count against a predefined error propagation tolerance value; and
 a second executable portion for reporting if the predefined error propagation tolerance value is exceeded to provide a health status of the upgrade procedure, wherein if a subsequent performance of the upgrade procedure on an additional node element is unsuccessful, the error propagation count is incremented and a critical error is reported so as to avoid propagation of an upgrade error.

17. The computer program product of claim 16, further including a third executable portion for, pursuant to the subsequent performance of the upgrade procedure, setting at least one persistent checkpoint timestamp to provide for error recovery.

18. The computer program product of claim 16, further including:
 a third executable portion for estimating a time needed to perform the upgrade procedure as a function of time information obtained from previous performances of the upgrade procedure on additional node elements so as to provide greater accuracy to the estimation of time needed; and
 a fourth executable portion for comparing the estimation of the time needed with a predefined upgrade window, wherein if the estimation is within the predefined upgrade window, the subsequent upgrade procedure is performed on the additional node element.

* * * * *

UNITED STATES PATENT AND TRADEMARK OFFICE
CERTIFICATE OF CORRECTION

PATENT NO.       : 8,108,734 B2                                     Page 1 of 1
APPLICATION NO.  : 12/610517
DATED            : January 31, 2012
INVENTOR(S)      : Andrews et al.

It is certified that error appears in the above-identified patent and that said Letters Patent is hereby corrected as shown below:

In the drawing

Figure 5, step 166, delete "finish" and insert -- start --.
Figure 5, step 178, delete "<" and insert -- > --.

Column 11, line 3, delete "complete"
Column 11, line 14, delete "(step 196)" and insert -- (step 164) --.
Column 11, line 24, delete "(step 174)" and insert -- (step 164) --.

Signed and Sealed this
Tenth Day of July, 2012

David J. Kappos
*Director of the United States Patent and Trademark Office*

UNITED STATES PATENT AND TRADEMARK OFFICE
CERTIFICATE OF CORRECTION

PATENT NO. : 8,108,734 B2
APPLICATION NO. : 12/610517
DATED : January 31, 2012
INVENTOR(S) : Benjamin L. Andrews et al.

It is certified that error appears in the above-identified patent and that said Letters Patent is hereby corrected as shown below:

Drawing Sheet 3 of 5, FIG. 3, step 104, "More nodes in need upgrading list" should read --More nodes in needs upgrading list--. (see replacement sheet 3 of 5 attached)

Column 5, line 12, "Seventy" should read --Seventh--.

Column 5, line 57, "nodesthat" should read --nodes that--.

Column 6, line 54, "on progress" should read --in progress--.

Column 11, line 19, "(again, step 174)" should read --(again, step 196)--.

Column 10, lines 49-50, "upgrade finish timestamp" should read --reboot start timestamp--.

Column 11, line 3, "complete" (as deleted in Certificate of Correction issued July 10, 2012) is reinstated.

Column 11, lines 5-6, "reboot complete timestamp" should read --reboot start timestamp--.

Signed and Sealed this
Twenty-sixth Day of February, 2013

Teresa Stanek Rea
*Acting Director of the United States Patent and Trademark Office*